Figure 1:
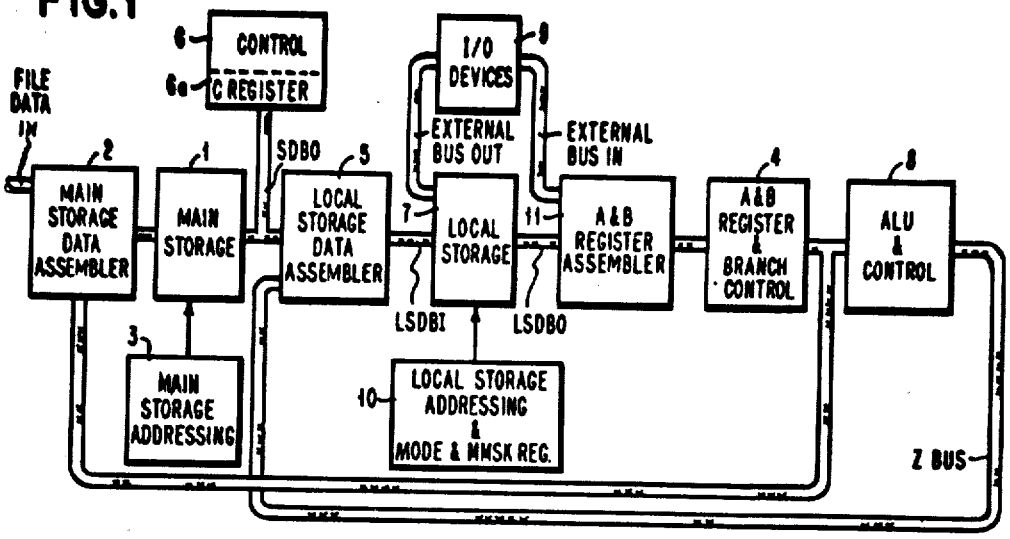
Figure 2:
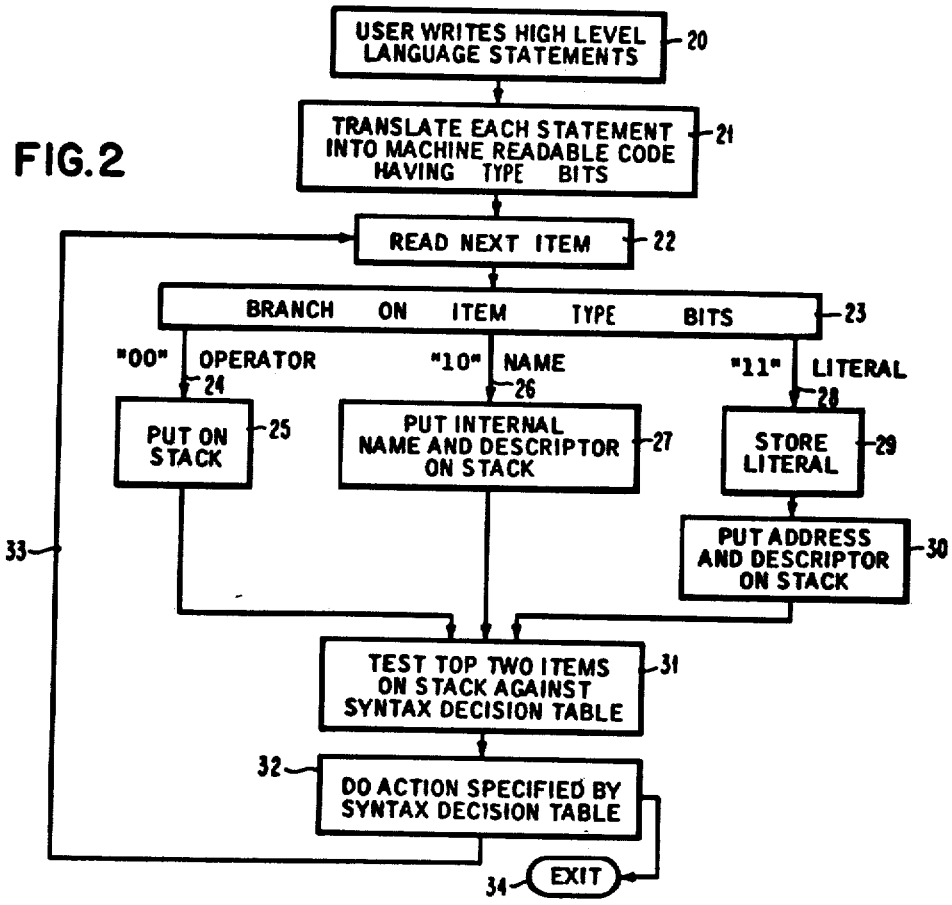
Figure 3:
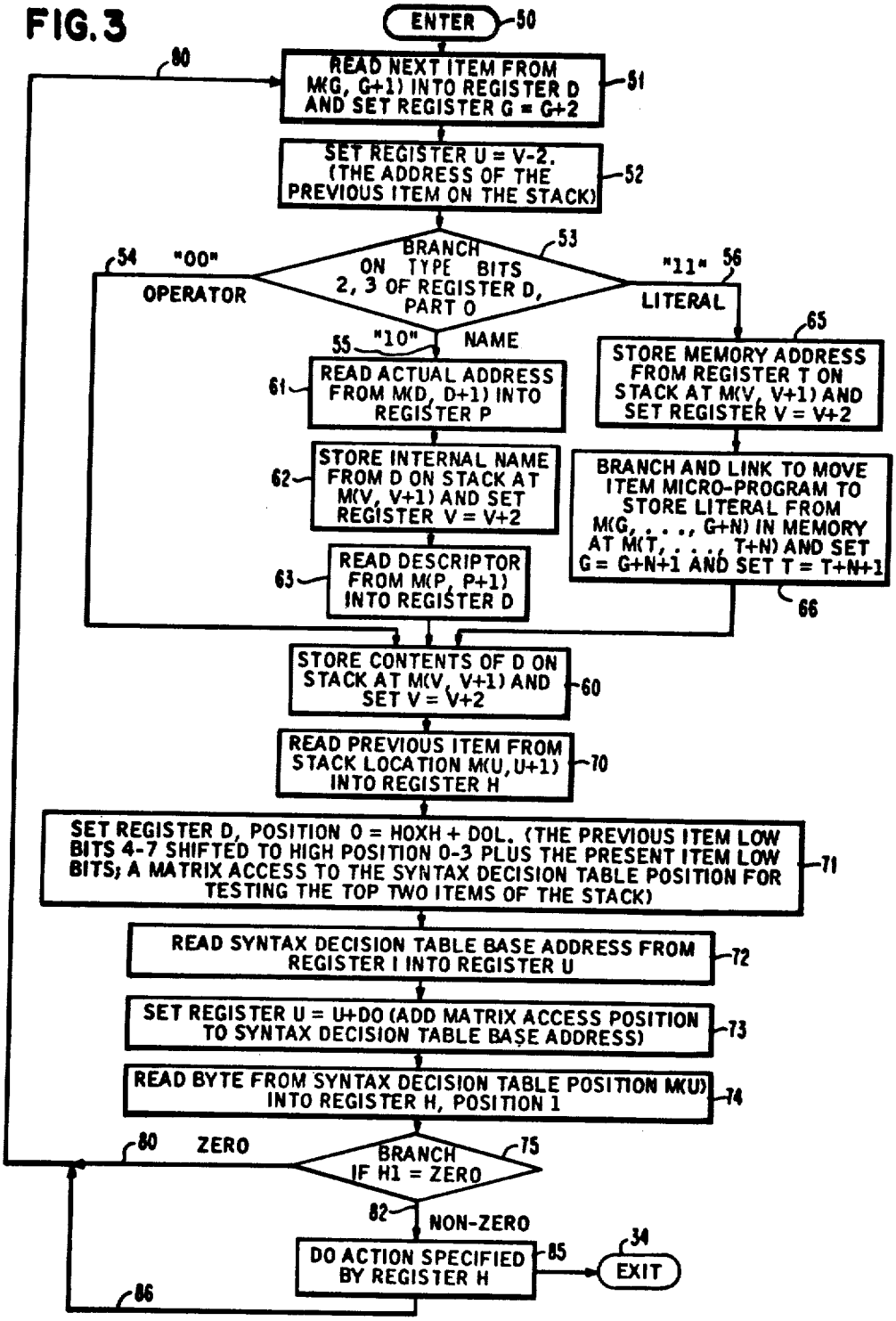

United States Defensive Publication

[19] (H) [11] T954,011

Hassitt

[43] Jan. 4, 1977

[54] METHOD AND APPARATUS FOR OPERATING COMPUTER APPARATUS IN RESPONSE TO PROGRAM STATEMENTS

[75] Inventor: Anthony Hassitt, Palo Alto, Calif.

[73] Assignee: International Business Machines Corporation, Armonk, N.Y.

[21] Appl. No.: 550,387

[22] Filed: Feb. 18, 1975

Related U.S. Application Data

[63] Continuation of Ser. No. 129,739, March 31, 1971.

[51] Int. Cl.[2] ..... G06F 9/06

[52] U.S. Cl. ..... 444/1; 340/172.5

[57] ABSTRACT

Method and apparatus for directly translating higher-level language program statements into machine readable form, the translation including syntax information for each item of each statement and having type bits included therein to indicate its type. The types include names, operators and literals. The translated items are then sequentially scanned and the type bits analyzed to partially process the machine readable items and supply the partially processed information to a stack. The top two items on the stack are analyzed in accordance with a syntax decision table to operate computer apparatus to conduct operations identified by the partially processed information. Thus, the computer apparatus accomplishes the syntax analysis rather than by means of a compiler.

3 Claims, 2 Sheets Drawing,

51 Pages Specification

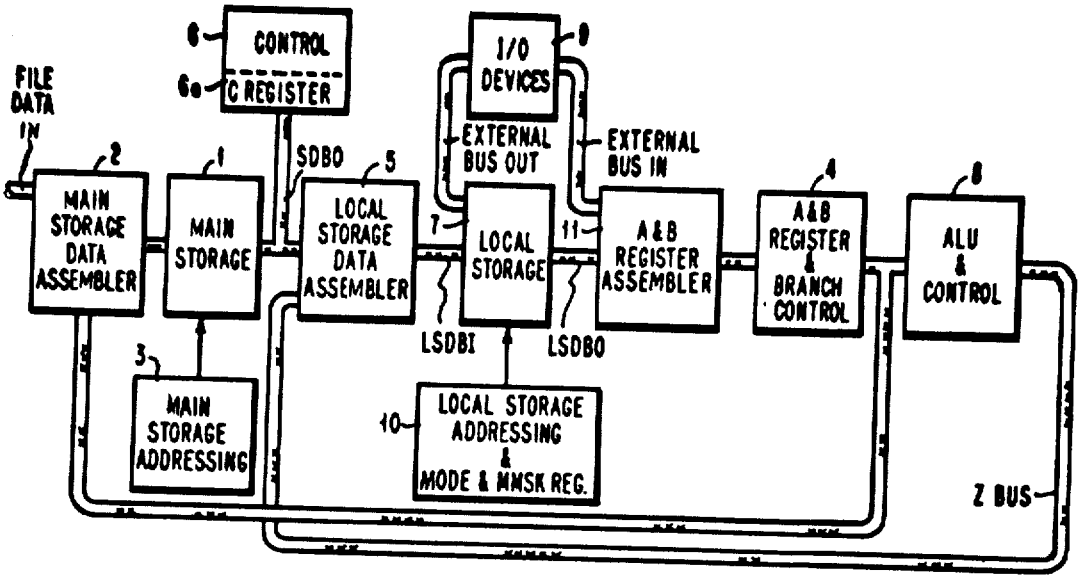

The file of this unexamined application may be inspected and copies thereof may be purchased (849 O.G. 1221, Apr. 9, 1968).